US006460033B1

(12) United States Patent
Perttunen

(10) Patent No.: US 6,460,033 B1
(45) Date of Patent: Oct. 1, 2002

(54) BROWSING METHODS, ARTICLES AND APPARATUS

(76) Inventor: Cary D. Perttunen, 11764 Raintree Ct., Shelby Township, MI (US) 48315

( * ) Notice: Subject to any disclaimer, the term of this patent is extended or adjusted under 35 U.S.C. 154(b) by 0 days.

(21) Appl. No.: 09/533,545

(22) Filed: Mar. 23, 2000

Related U.S. Application Data

(63) Continuation-in-part of application No. 09/243,595, filed on Feb. 3, 1999.

(51) Int. Cl.⁷ .............................................. G06F 17/00
(52) U.S. Cl. ..................... 707/4; 707/5; 707/6; 707/514
(58) Field of Search ...................... 707/1–206, 500–514

(56) References Cited

U.S. PATENT DOCUMENTS

| | | | |
|---|---|---|---|
| 5,675,733 A | | 10/1997 | Williams |
| 5,721,899 A | * | 2/1998 | Namba ........................... 707/6 |
| 5,724,567 A | * | 3/1998 | Rose et al. ..................... 707/6 |
| 5,737,594 A | * | 4/1998 | Williams ....................... 707/6 |
| 5,987,469 A | | 11/1999 | Lewis et al. |
| 6,104,400 A | | 8/2000 | Halachmi et al. |
| 6,144,962 A | | 11/2000 | Weinberg et al. |
| 6,145,000 A | | 11/2000 | Stuckman et al. |

OTHER PUBLICATIONS

Yang et al., "HTML page analysis based on visual cues", Document Analysis and Recognition, 2001, Proceedings, Sixth International Conference on, 2001, pp. 859–864.*

Hiraishi et al., "Design of a visual browser for network intrusion detecton", Enabling Technologies: Infrastructure for Collaborative Enterprises, 2001. WET ICE 2001, Proceedings. Tenth IEEE International Workshops on, 2001, pp. 132–137.*

Li et al., "Path planning with incremental roadmap update for large environments", Robotics and Automation, 2001, Proceedings 2001 ICRA. IEEE International Conference on, vol. 2, 2001, pp. 1934–1939, vol. 2.*

Johnson et al., Applied Multivariate Statistical Analysis, 1982, pp. 532–573, Prentice–Hall, Englewood Cliffs.

Tucker, Applied Combinatorics, Second Edition, 1984, pp. 28–31 and 80–131, John Wiley & Sons, New York.

Luger et al., Artificial Intelligence and the Design of Expert Systems, 1989, pp. 88–99, Benjamin/Cummings Publishing, Redwood City.

CRC Standard Mathematical Tables and Formulae, 29$^{th}$ Edition, 1991, pp. 106–107, CRC Press, Boca Raton.

American Heritage Dictionary of the English Language, Third Edition, 1992, inside back cover, Houghton Mifflin, Boston.

"The best chart type for my data," help screen from Microsoft Excel for Windows 95, 1995.

Using Visio Products, 1997, pp. 119–122, 185–202 and 207–232, Visio Corporation, Seattle.

Hyman, Dynamic HTML for Dummies, 1997, pp. 63–79, IDG Books, Foster City.

(List continued on next page.)

Primary Examiner—David Y. Jung

(57) ABSTRACT

A plurality of items are browsed using a non-unary tree which relates the plurality of items and a browsing sequence. A signal is outputted to display content associated with a current item in the browsing sequence. In response to receiving a selection of one of a first control and a second control, all items which are tree-descendants of the current item are removed from the browsing sequence if the first control has been selected and the current item is an internal item of the tree. Further in response to receiving the selection, a signal is outputted to display content associated with an item subsequent to the current item in the browsing sequence if the current item is a non-final item in the browsing sequence.

18 Claims, 9 Drawing Sheets

OTHER PUBLICATIONS

Lehto et al., Official Microsoft FrontPage 98 Book, 1997, pp. 32–52, Microsoft Press, Redmond.

Tittel et al., HTML 4 for Dummies, 1998, pp. 12–13 and 283–293, IDG Books, Foster City.

"Aurigin Announces General Availability of Version 6.0 of its Intellectual Property Asset Management System," Web page from Aurigin Systems, Oct. 1998.

"The Brain," Web page from PC Magazine Online, Apr. 1998.

"Roland Introduces HPD–15 HandSonic Hand Percussion Pad", Feb. 3, 2000, Roland Corporation U.S., Los Angeles.

"HPD–15 HandSonic", printed from the Internet on Jan. 3, 2001, http://209.144.99.11/Products/hardware/hpd15.htm.

* cited by examiner

BROWSING METHODS, ARTICLES AND APPARATUS

RELATED APPLICATION

The present application is a continuation-in-part of "METHODS, ARTICLES AND APPARATUS FOR VISIBLY REPRESENTING INFORMATION AND FOR PROVIDING AN INPUT INTERFACE", having Ser. No. 09/243,595, filed Feb. 3, 1999, whose disclosure is hereby incorporated by reference into the disclosure of the present application.

TECHNICAL FIELD

The present invention relates to browsing methods, articles and apparatus.

BACKGROUND OF THE INVENTION

Many Internet portals provide a search engine with which a user may initiate an Internet search. The search engine returns a list of Web pages based upon a search expression received from the user.

Some search engines display a similarity value for each Web page in the list. Each similarity value numerically indicates a degree of correlation or relevance between its corresponding Web page and the search expression.

Oftentimes, the Web pages in the list are sorted based on the similarity values. By sorting the Web pages in this manner, the list presents highly-relevant Web pages before lesser-relevant Web pages.

Due to the rapid growth in the number of Web pages available via the Internet and the improved capabilities of today's search engines, many searches yield an undesirably large number of Web pages in the list. Browsing the list in a linear manner may be cumbersome in these and other cases.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF PREFERRED EMBODIMENTS

Improved methods, articles and apparatus for browsing a plurality of items are disclosed herein. Using a first control and a second control, an end user may browse the items in accordance with a browsing sequence and a tree which relates the items. In response to receiving a selection of one of the first control and the second control, all items which are tree-descendants of a current item are removed from the browsing sequence if the first control has been selected and the current item is an internal item of the tree. Further in response to receiving the selection, a signal is outputted to display content associated with an item subsequent to the current item in the browsing sequence if the current item is a non-final item in the browsing sequence.

Figure 1:
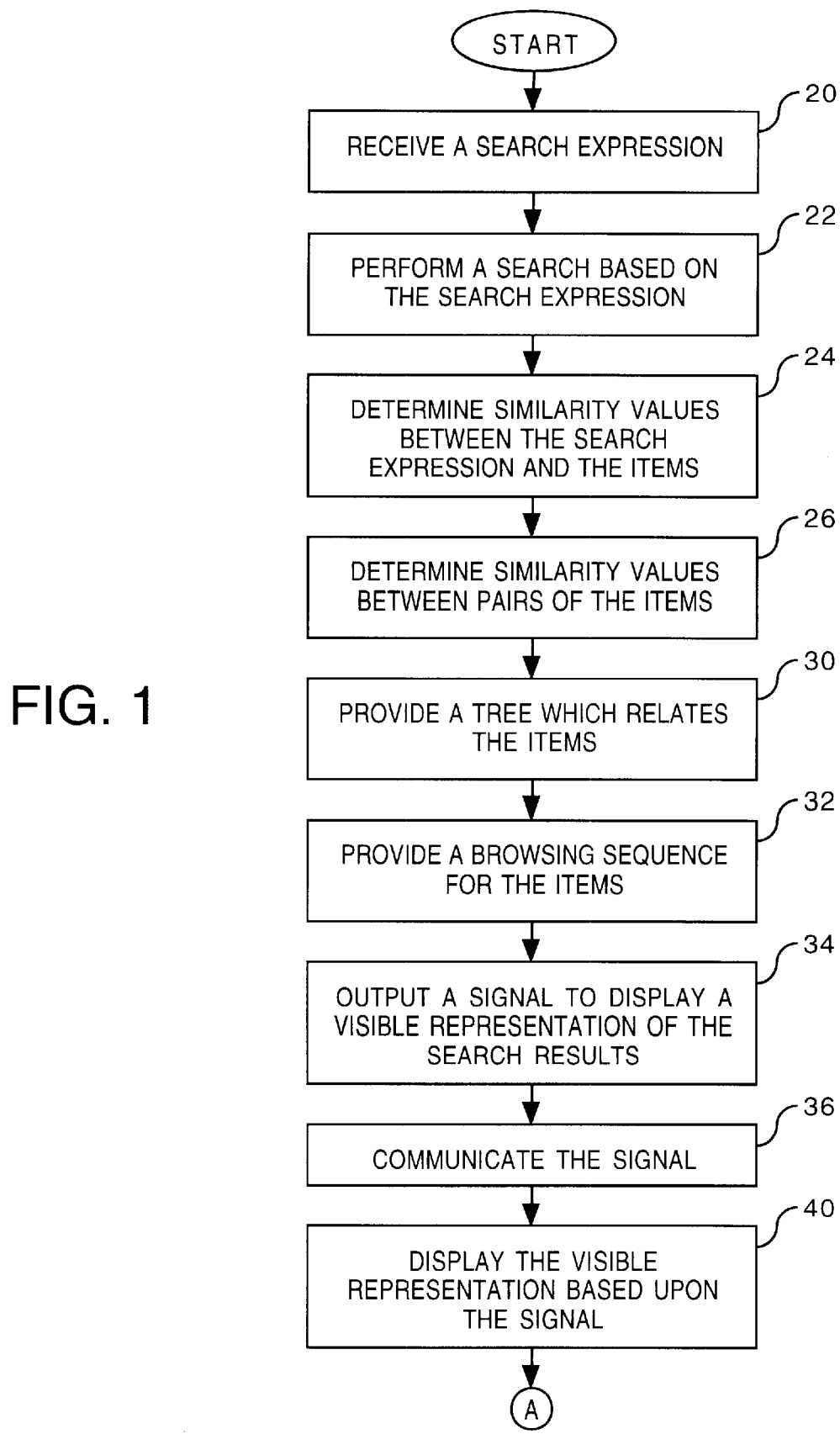
FIGS. 1 to 3 provide a flow chart of an embodiment of a method of browsing a plurality of items.
Figure 2:
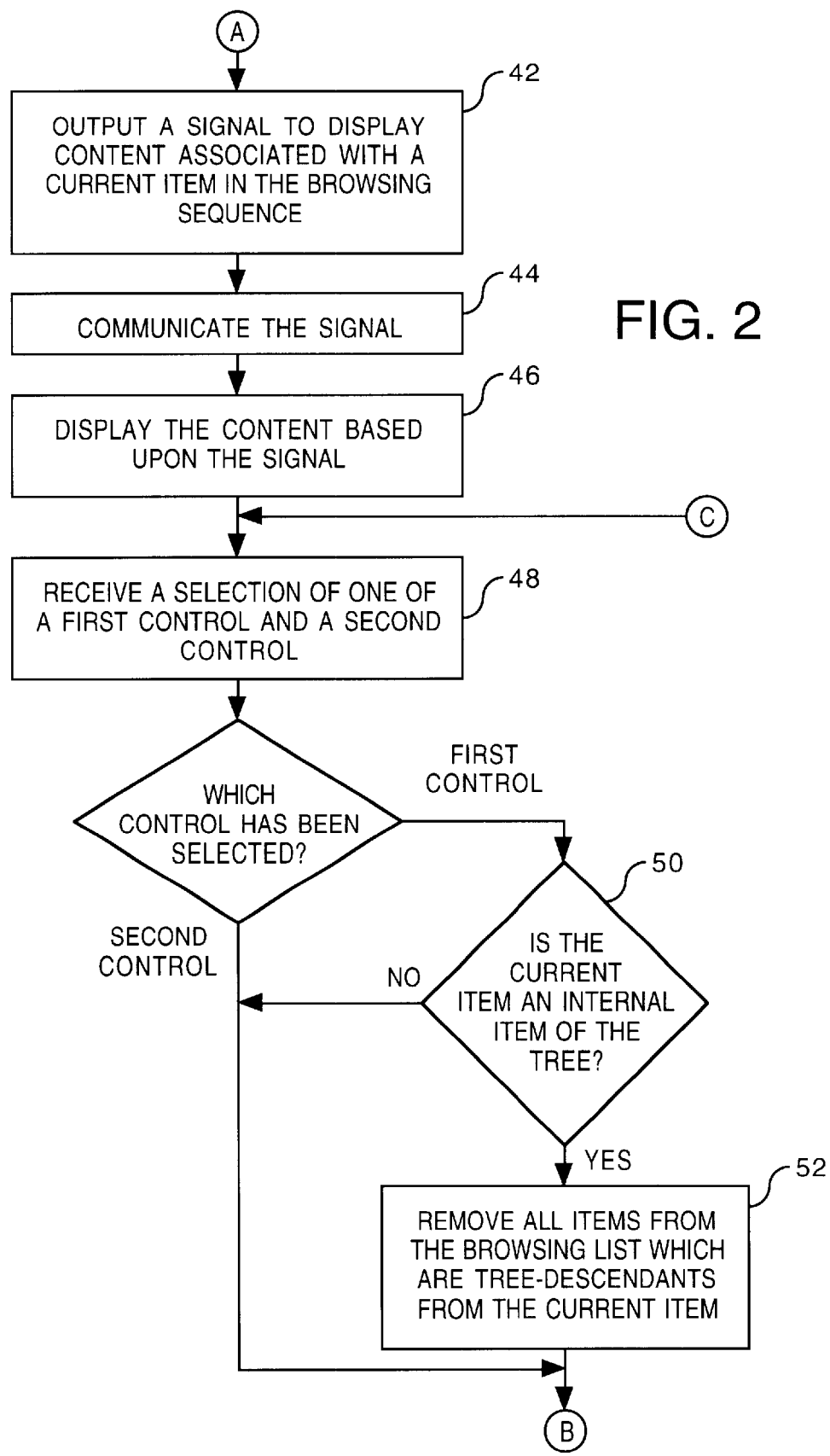
Figure 3:
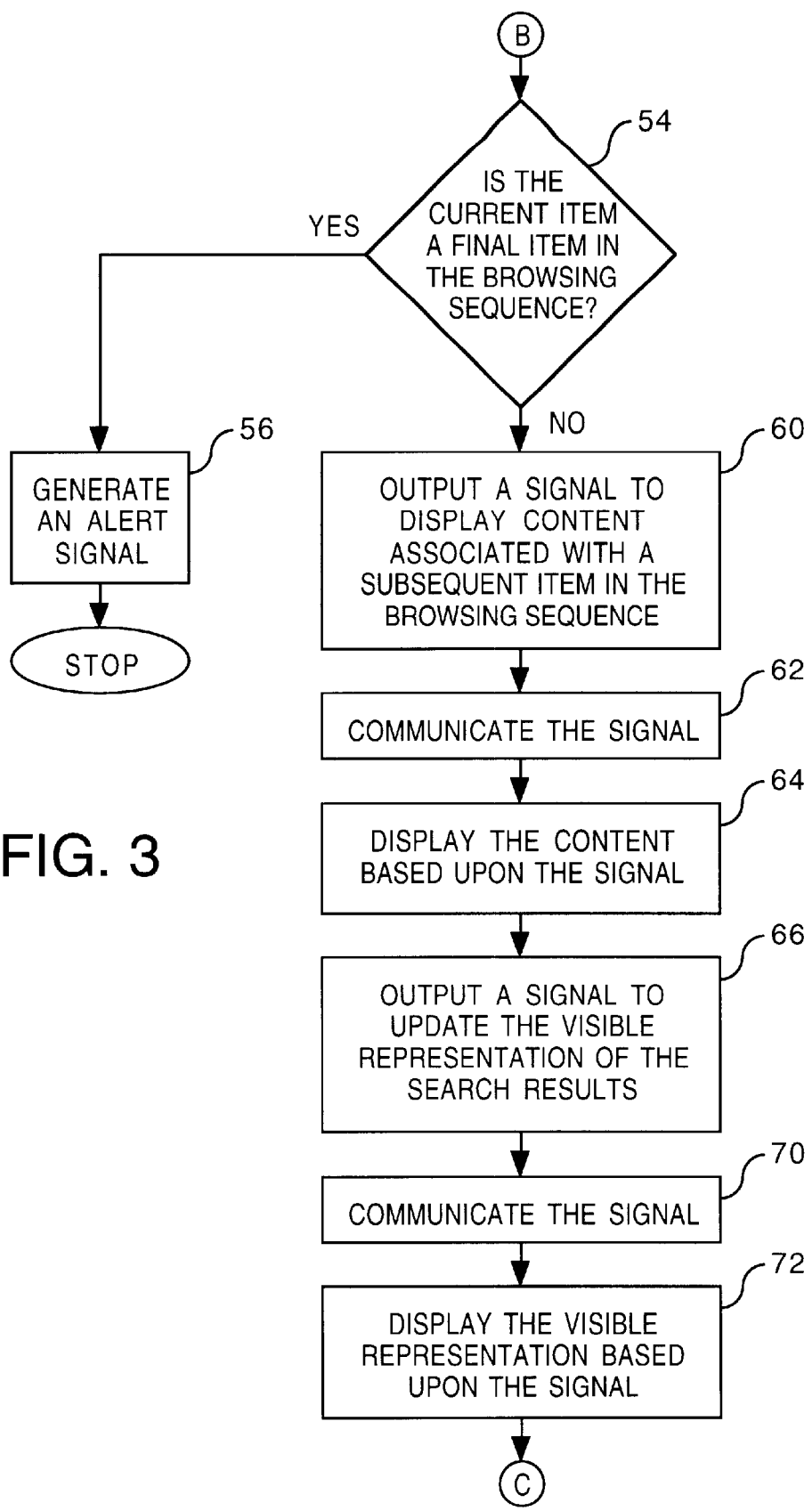

FIGS. 1 to 3 provide a flow chart of an embodiment of a method of browsing a plurality of items. Examples of the items are numerous. Examples of an item, include but are not limited to a physical object, a purchasable item, a computer address, a computer site, a Web page, audio content, an image, computer software, an information category, an information subcategory, an information source, a logical disk for a computer, a computer directory, a computer-readable file, computer-readable data, a computer-readable message, a general category, a general subcategory, a patent claim, an individual and a job position. In general, the specific type of items which are to be browsed is application-dependent.

For purposes of illustration and example, the embodiment of the method of browsing is disclosed within the context of a search. It should be appreciated, however, that embodiments of the method of browsing may be performed absent the search.

As indicated by block 20, the method comprises receiving a search expression. The search expression can be user-entered using an input device such as a keyboard, a touch screen, a touch pad or a voice input device. The search expression may contain one or more words in the form of either a boolean search expression or a natural language search expression, for example. The search expression may include information from a plurality of user-enterable fields to limit the scope of the search. The search expression may include an image or encoded audio.

As indicated by block 22, a search is performed based on the search expression. The search yields search results comprising a plurality of items, the plurality of items being a subset of a larger set of items. In general, the search results may comprise any of the herein-mentioned items. Particular examples of search results include, but are not limited to, a subset of computer-readable files, a subset of computer-readable messages, a subset of computer-readable images, a subset of purchasable items, a subset of individuals, a subset of job positions, a subset of computer addresses, a subset of filenames, and a subset of computer-readable data items from a computer-readable database.

As indicated by block 24, the method optionally comprises determining a first plurality of similarity values between the search expression and the plurality of items. Each of the first plurality of similarity values indicates a degree of similarity, relevance or correlation between the search expression and a corresponding one of the items of the subset.

Referring back to block 22, the search results may consist of either a predetermined number of items which are most similar to the search expression, or a number of items whose similarity values with the search expression are beyond a threshold.

As indicated by block 26, the method optionally comprises determining a second plurality of similarity values between a corresponding plurality of pairs of the items. Each of the second plurality of similarity values indicates a degree of similarity, relevance or correlation between a corresponding pair of items of the subset.

As indicated by block 30, the method comprises providing a tree which relates the plurality of items. Various computer-readable data structures can be used to represent the tree in a computer-readable form using a computer-readable medium.

Before proceeding, a review of trees and graph-related terminology is provided. A graph is definable by a set of nodes and a set of edges joining or associating different pairs of distinct nodes. The edges in the graph may be either directed or undirected.

Alternative terminology may be used to describe the graph. Examples of synonyms of "node" include, but are not limited to, "vertex" and "state". Examples of synonyms of "edge" include, but are not limited to, the terms "arc" and "link". Therefore, the herein-disclosed methods, articles, apparatus, and examples should not be limited by the selected terminology used to describe the graph.

A first node is said to be adjacent to a second node if there is an edge from the first node to the second node. A path is definable by a sequence of nodes wherein each consecutive pair of nodes in the sequence is adjacent.

A tree is a graph having a unique path from a designated node, called a root node, to each of its other nodes. If the tree is undirected, then any of its nodes can be designated to be the root node. An undirected tree can be made into a directed tree by directing all edges away from the designated root node.

Each node in a directed tree, except for the root node, is a child node of a unique parent node from which an edge is directed thereto. Nodes having the same parent node are called siblings. Nodes of a directed tree with no children are called leaf nodes. Nodes having at least one child are called internal nodes. The level number of a node is defined as the number of edges in the path between the node and the root node. The height of the tree is the largest level number of any node.

If each internal node of a rooted tree has m children, the tree is called an m-ary tree. If m=1, the tree is unary. If m=2, the tree is binary. If m=3, the tree is ternary.

Referring back to block 30, each of the plurality of items is represented by a corresponding node of the tree. Relationships between items are represented by edges in the tree. Examples of edge-represented relationships are numerous. Examples of relationships between items include, but are not limited to, a degree of similarity, a hyperlink, an associative link, a state of being an element of, a state of being contained in, a state of being associated with, a state of reporting to, a state of being in a category, a state of depending from, and a state of being a reply to.

It is preferred that the tree is non-unary. By being non-unary, the tree has at least one internal node with two or more child nodes. It is also preferred that the tree has a height of at least two. It is further preferred that the tree has more leaf nodes than a number of child nodes emanating from its root node.

The tree may be provided by determining an optimum path tree based upon the first plurality of similarity values and the second plurality of similarity values. The optimum path tree indicates a respective optimum path between the search expression and each of the plurality of items.

The optimum path between the search expression and an item has an optimum function value of similarity values between the search expression and the computer-readable item. Examples of the function whose optimum value dictates the optimum path include, but are not limited to, a sum of similarity values between the search expression and the item, and a product of similarity values between the search expression and the item. To determine an optimum product of similarity values, an additive optimum path algorithm may be performed on a logarithm of the similarity values.

As is known in the art of network algorithms, examples of algorithms to compute the shortest paths include, but are not limited to, Dijkstra's algorithm and Floyd's algorithm. Those having ordinary skill can review shortest path algorithms on pp. 123–127 of A. Tucker, *Applied Combinatorics, Second Edition*, John Wiley & Sons, 1984, which is hereby incorporated by reference into this disclosure.

Alternatively, the tree may be provided by determining a spanning tree based upon the first plurality of similarity values and the second plurality of similarity values. Examples of the spanning tree include, but are not limited to, an optimum spanning tree such as a minimum spanning tree, and a search tree.

The optimum spanning tree has an optimum function value of similarity values. Examples of the function whose optimum value dictates the optimum spanning tree include, but are not limited to, a sum of similarity values, and a product of similarity values. To determine an optimum product of similarity values, an additive optimum spanning tree algorithm may be performed on a logarithm of the similarity values.

As is known in the art of network algorithms, examples of algorithms to compute a minimum spanning tree include, but are not limited to, Kruskal's algorithm and Prim's algorithm. Those having ordinary skill can review minimum spanning trees on pp. 127–131 of A. Tucker, *Applied Combinatorics, Second Edition*, John Wiley & Sons, 1984, which is hereby incorporated by reference into this disclosure.

Examples of the search tree include, but are not limited to, a depth-first search spanning tree, a breadth-first search spanning tree, or a best-first search spanning tree. Those having ordinary skill can review search trees on pp. 80–122 of A. Tucker, *Applied Combinatorics, Second Edition*, John Wiley & Sons, 1984, which is hereby incorporated by reference into this disclosure.

As indicated by block 32, the method comprises providing a browsing sequence for the plurality of items. Various computer-readable data structures can be used to represent the browsing sequence in a computer-readable form using a computer-readable medium.

The browsing sequence may be provided by sorting the items according to the first plurality of similarity values. In this way, the items may be sorted from most-similar to least-similar to the search expression.

Alternatively, the browsing sequence may comprise a search sequence of the tree provided in block 30. In this case, for example, the browsing sequence may comprise either a depth-first search sequence or a breadth-first search sequence of the tree.

As another alternative, the browsing sequence may comprise a chronological sequence for the items. In this case, the items may be sorted either from most-recent to least-recent, or from least-recent to most-recent.

As indicated by block 34, the method comprises outputting a signal to display a visible representation of the search results. The visible representation of the search results may be textual, graphical, or a combination thereof. In one embodiment, the visible representation is determined in accordance with the disclosure of "METHODS, ARTICLES AND APPARATUS FOR VISIBLY REPRESENTING INFORMATION AND FOR PROVIDING AN INPUT INTERFACE", which is incorporated by reference into the present disclosure.

As indicated by block 36, the method optionally comprises communicating the signal. The signal is communicated by a waveform representative thereof through a communication medium. Examples of the waveform and the communication medium include, but are not limited to, an optical waveform through an optical medium, an electronic waveform through an electronic medium, and an electromagnetic waveform through an electromagnetic medium.

Examples of the signal include, but are not limited to, a display signal and a computer data signal. The display signal may be communicated either through a video cable or wirelessly to a display device. The computer data signal may be communicated via a computer network. Examples of the computer network include, but are not limited to, an intranet, an internet and an extranet. The computer data signal may include computer program code to assist in displaying the region. Of particular interest is the signal being representative of code in a markup language such as HTML (hypertext markup language), HDML (handheld device markup language), or WML (wireless markup language).

As indicated by block 40, the method optionally comprises displaying the visible representation based upon the signal. The visible representation may be displayed by a display device. Examples of the display device include, but are not limited to, a computer monitor, a television, a liquid crystal display, a cathode ray tube, and a gas plasma display. For a computer data signal, the signal is received by a computer in communication with the computer network. The computer generates a display signal to display the visible representation on the display device.

As indicated by block 42, the method comprises outputting a signal to display content associated with a current item in the browsing sequence. Initially, the current item may be the first item in the browsing sequence. Alternatively, the current item may be any user-selected item in the browsing sequence.

Examples of the content include, but are not limited to, content associated with a physical object, a purchasable item, a computer address, a computer site, a Web page, audio content, an image, computer software, an information category, an information subcategory, a logical disk for a computer, a computer directory, a computer-readable file, computer-readable data, a computer-readable message, a general category, a general subcategory, a patent claim, an individual and a job position. In some applications, the content may comprise a summary of any of the above items. The content may include visible content and/or audible content.

As indicated by block 44, the method optionally comprises communicating the signal. The signal is communicated by a waveform representative thereof through a communication medium. Examples of the signal, waveform, and communication medium are given with reference to block 36. As indicated by block 46, the method optionally comprises displaying the content based upon the signal.

As indicated by block 48, the method comprises receiving a selection of one of a first control and a second control. The selection is performed using an input device such as a pointing device, one of a series of keys, a rocker switch, or a voice input device. Examples of pointing devices include, but are not limited to, a mouse, a touch pad, a track ball, a joystick, a pointing stick, and a touch screen. Examples of keys include, but are not limited to, scroll control keys and cursor control keys. Examples of rocker switches include, but are not limited to, a two-way rocker switch and a four-way rocker switch.

Examples of the first control and the second control are numerous. The first control and the second control may comprise, for example: a first position and a second position of a rocker switch; a first button and a second button of a mouse; a first spoken command and a second spoken command; a first user-selectable display region and a second user-selectable display region; and a first key and a second key of a keyboard.

If the first control has been selected, an act of determining if the current item is an internal item of the tree is performed, as indicated by block 50. If so, an act of removing all items from the browsing sequence which are tree-descendants of the current item is performed, as indicated by block 52.

If either the second control has been selected, or the first control has been selected and the current item is a leaf item of the tree, or the act indicated by block 52 has been performed, an act of determining if the current item is a final item in the browsing sequence is performed, as indicated by block 54. If the current item is the final item, an optional act of generating an alert signal is performed, as indicated by block 56. The alert signal may provide an audible alert and/or a visible alert to the end user that there are no subsequent items in the browsing sequence.

If the current item is a non-final item in the browsing sequence, an act of outputting a signal to display content associated with an item subsequent to the current item in the browsing sequence is performed, as indicated by block 60. The subsequent item is considered as the current item for subsequent acts. As indicated by block 62, the method optionally comprises communicating the signal. The signal is communicated by a waveform representative thereof through a communication medium. Examples of the signal, waveform, and communication medium are given with reference to block 36. As indicated by block 64, the method optionally comprises displaying the content based upon the signal.

Optionally, as indicated by block 66, the method comprises outputting a signal to update the visible representation of the search results. The visible representation may be updated to indicate that the subsequent item is now considered as the current item, and/or to indicate that one or more items have been removed from the browsing list. The visible representation may be updated in accordance with the disclosure of "METHODS, ARTICLES AND APPARATUS FOR VISIBLY REPRESENTING INFORMATION AND FOR PROVIDING AN INPUT INTERFACE", which is incorporated by reference into the present disclosure.

As indicated by block 70, the method optionally comprises communicating the signal. The signal is communicated by a waveform representative thereof through a communication medium. Examples of the signal, waveform, and communication medium are given with reference to block 36. As indicated by block 72, the method optionally comprises displaying the visible representation based upon the signal.

Flow of the method is redirected back to block 48, wherein another selection is received and processed.

The above-described method may be augmented with other acts. For example, the method may further comprise outputting a signal to display a user-viewable advertisement. The signal to display the user-viewable advertisement may encode an image and/or graphics in the advertisement, or may provide a link to an image and/or graphics in the advertisement. The user-viewable advertisement may be viewable by the user while at least one of the first control and the second control is selectable by the user, and/or while the visible representation of the search results is viewable by the user. Here, for example, the user-viewable advertisement, the content of the current item, the first control and the second control may be contained within a single Web page.

As another example, the above-described method may be augmented to perform an act based on the current item. The act may be performed in response to receiving a user action via an input device, such as any of those described with reference to block 48. The act may include, but is not limited to, any of the following examples. If the plurality of items include a plurality of purchasable items, the act may include: providing information for the particular purchasable item, and/or performing a transaction for the particular purchasable item. If the plurality of items include a plurality of computer addresses, the act may include linking to the particular computer address. If the plurality of items include a plurality of computer-readable files, the act may include opening the computer-readable file. If the plurality of items include a plurality of records from a database, the act may include any combination of retrieving, processing, displaying, modifying, or deleting the record from the database. As either an alternative or in addition to the acts in the aforementioned examples, the at least one act may include outputting a signal to display a user-viewable advertisement. The signal to display the user-viewable advertisement may encode an image and/or graphics in the advertisement, or may provide a link to an image and/or graphics in the advertisement.

An apparatus for performing embodiments of the herein-disclosed method may comprise one or more programmed computers. Each programmed computer may provide a particular functionality implemented using hardware and/or software and/or firmware.

Preferably, a programmed computer includes a computer memory encoded with executable instructions representing a computer program. A processor is responsive to the computer memory to perform a series of specifically identified operations dictated by the computer program. In this way, the computer program can cause the computer to act in a particular fashion.

Examples of the processor include, but are not limited to, a general purpose microprocessor, an application-specific integrated circuit (which may be either standard or custom), one or more discrete logic elements, a digital signal processor, one or more circuits, or any combination thereof. It is noted that the processor may be embodied by either a single processing unit or a plurality of processing units. For example, the processor may be embodied by either a single, central processing unit or a plurality of distributed processing units.

Examples of the computer memory include, but are not limited to, an electronic memory, a magnetic memory, an optical memory, and a magneto-optical memory. Examples of an electronic memory include, but are not limited to, a programmable electronic memory and a read-only, hard-wired electronic memory. Examples of a magnetic memory include, but are not limited to, a magnetic disk and a magnetic tape. The magnetic disk may be embodied by a magnetic floppy diskette or a magnetic hard drive, for example. Examples of an optical memory include, but are not limited to, an optical disk. The optical disk may be embodied by a compact disk or a DVD, for example. Regardless of its form, the computer memory may be either read-only, once-writable, or rewritable.

In general, the processor may be responsive to any data structures, computer programs, and signals encoded on a computer-readable medium to perform an embodiment of any of the herein-disclosed methods and examples. Examples of the computer-readable medium include, but are not limited to, computer-readable storage media and computer-readable communication media. Examples of computer-readable storage media are described with reference to the computer memory. Examples of computer-readable communication media are described with reference to block 36.

The computer is coupled to a display to display the content described herein and other visible information to an end user. Optionally, the display may also display user-selectable regions for the first control and the second control. Examples of the display include any of the herein-disclosed display devices.

The computer receives user input from one or more input devices. Examples of the one or more input devices include any of the herein-disclosed input devices. The computer processes the user input and/or communicates at least one signal based upon the user input. The display and the one or more input devices facilitate user interaction with the computer.

Embodiments of the herein-disclosed methods and examples can be performed using either a single computer or a plurality of computers. A plurality of computers may cooperate in a client-server fashion, for example, wherein a server computer outputs at least one signal to cause a client computer to display a visible representation and/or to provide a user interface.

An example is given to illustrate one embodiment of a method and apparatus for browsing a plurality of items. As should be appreciated, the scope of the present disclosure is not to be limited by this example. Other practical applications are contemplated based on the examples given in the parent application having Ser. No. 09/243,595.

Figure 4:
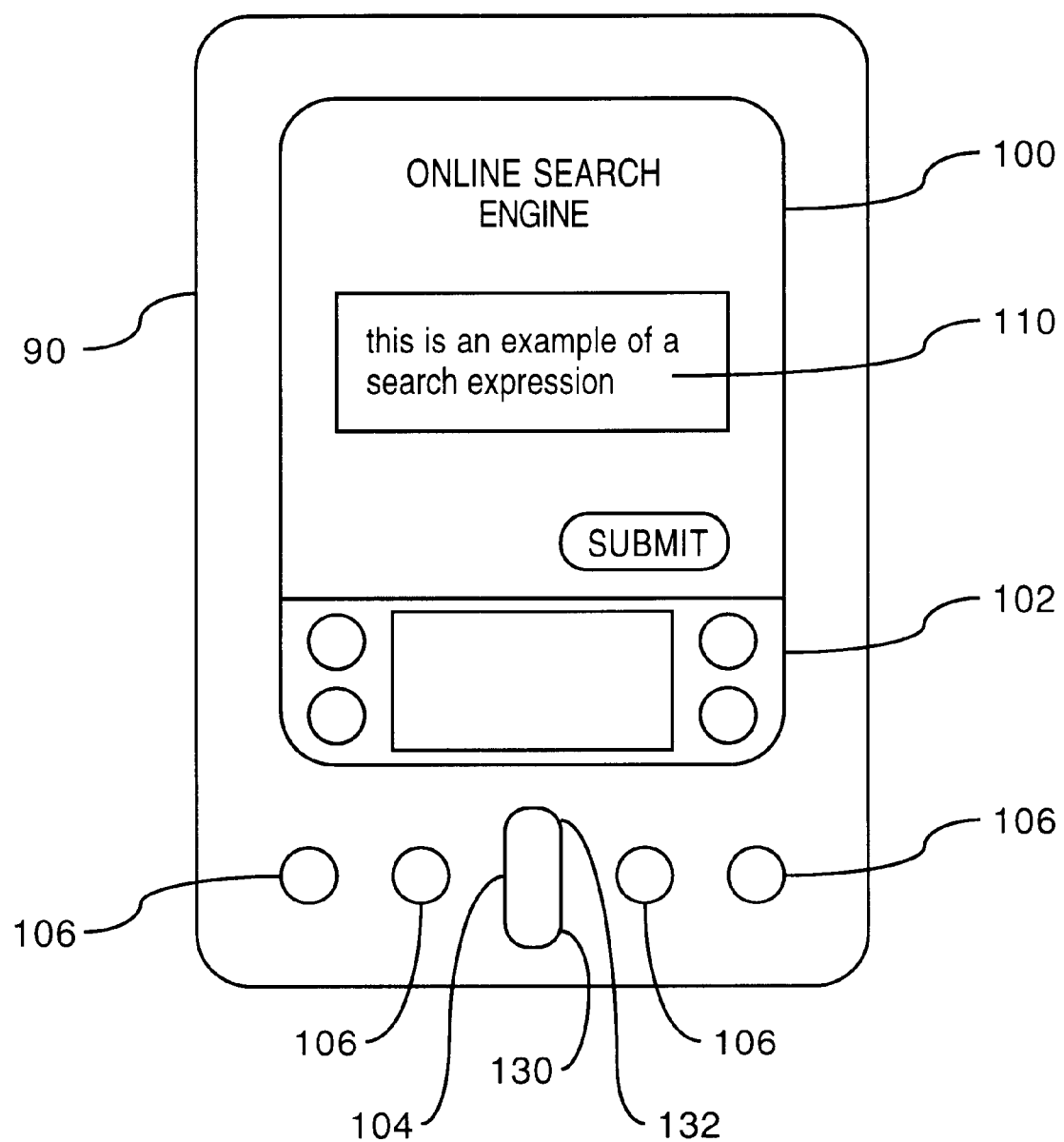
FIG. 4 shows an embodiment of an apparatus for browsing a plurality of items.

FIG. 4 shows an embodiment of an apparatus for browsing a plurality of items. The apparatus comprises a handheld computer 90 having a touch screen 100, a touch pad 102, a two-way rocker switch 104 and keys 106.

An end user may input a search expression 110 using the touch screen 100 and/or the touch pad 102. The search expression 110 is submitted to a search engine to perform a search. The apparatus may include either a wireless or a wireline interface to communicate with a computer site which provides the search engine.

For purposes of illustration and example, consider the search engine generating seven items based on the search expression. Based on similarity values, the search engine determines an optimum path tree indicating a respective optimum path between the search expression and each of the seven items. In this example, the similarity values are numerical values between 0% and 100%. An additive minimum path algorithm is performed on a negative logarithm of the non-zero similarity values, e.g. -log(similarity value), to determine a maximum product of similarity values.

Figure 5:
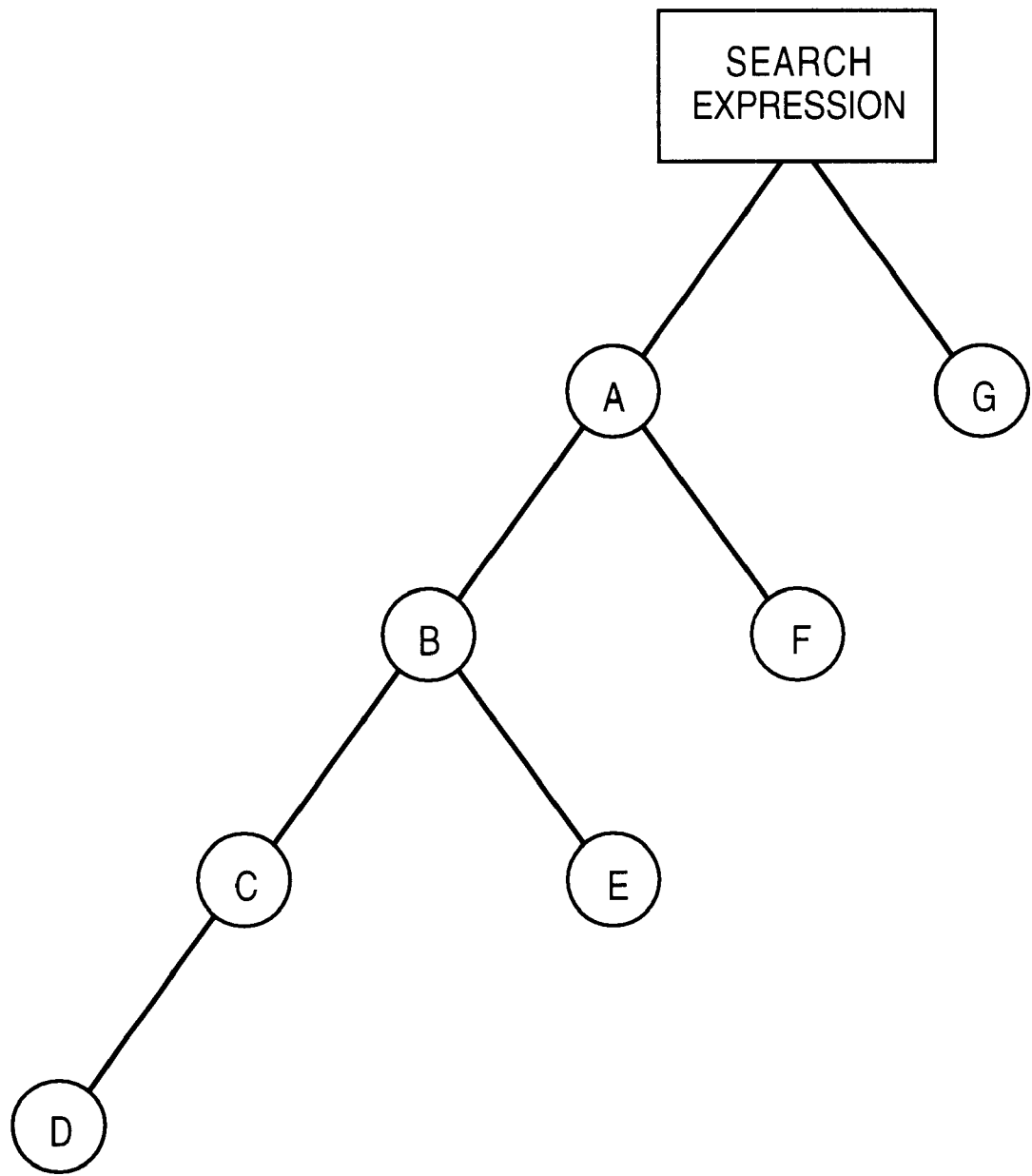
FIG. 5 schematically shows an optimum path tree which relates a plurality of items.

FIG. 5 schematically shows the optimum path tree. Each item is represented by a circle. The search expression is represented by a rectangle. The search expression is the root node in the tree.

The search engine also provides a browsing sequence for the items. The browsing sequence is based on a depth-first search sequence of the optimum path tree. The browsing sequence is as follows: {item A, item B, item C, item D, item E, item F, item G}.

Figure 6:
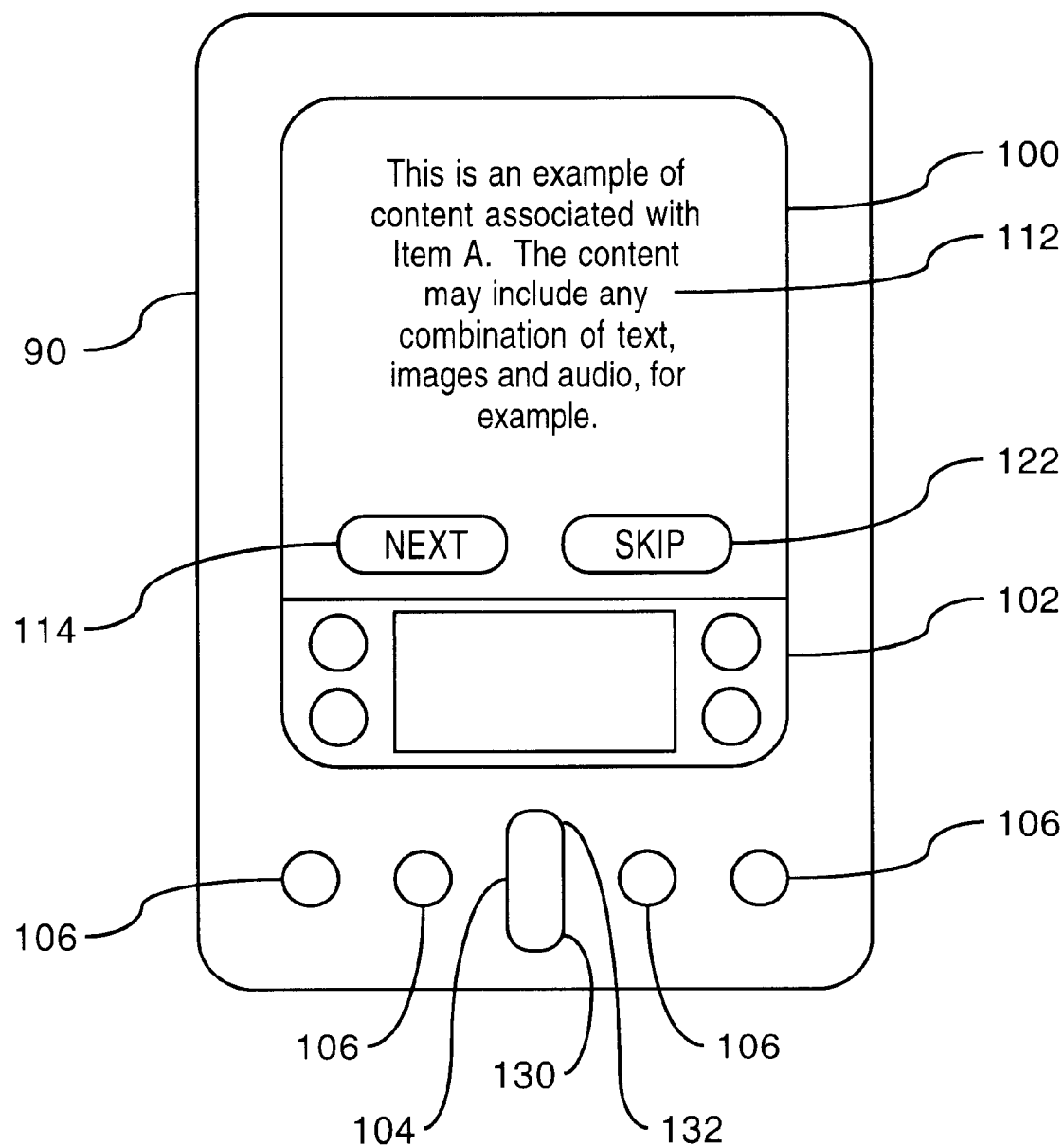
FIG. 6 shows an embodiment of a first display provided based on the search.

FIG. 6 shows an embodiment of a first display provided based on the search. The touch screen 100 displays content 112 associated with the first item in as the browsing sequence, namely item A. After viewing the content 112, consider the end user wishing to proceed to the next item in the browsing sequence. To proceed to the next item, the end user selects the second control by tapping (e.g. with a finger or a stylus) a portion 114 of the touch screen 100 which provides the second control.

Figure 7:
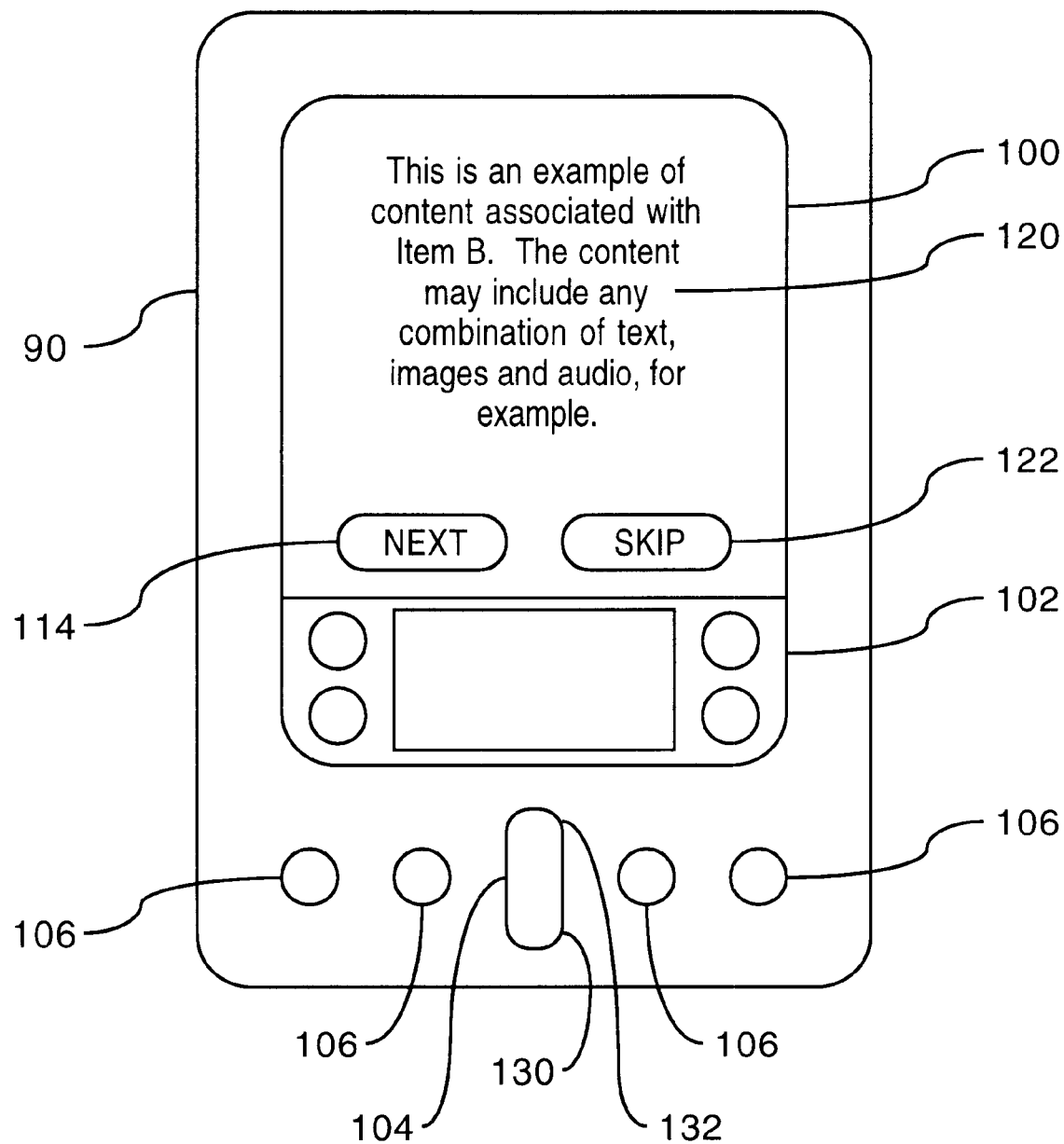
FIG. 7 shows an embodiment of a second display provided in response to the selection of the second control.

FIG. 7 shows an embodiment of a second display provided in response to the selection of the second control. The touch screen 100 displays content 120 associated with the second item in the browsing sequence, namely item B. After viewing the content 120, consider the end user wishing to skip the other tree-descendant items from item B. To skip these items, the end user selects the first control by tapping (e.g. with a finger or a stylus) a portion 122 of the touch screen 100 which provides the first control.

Figure 8:
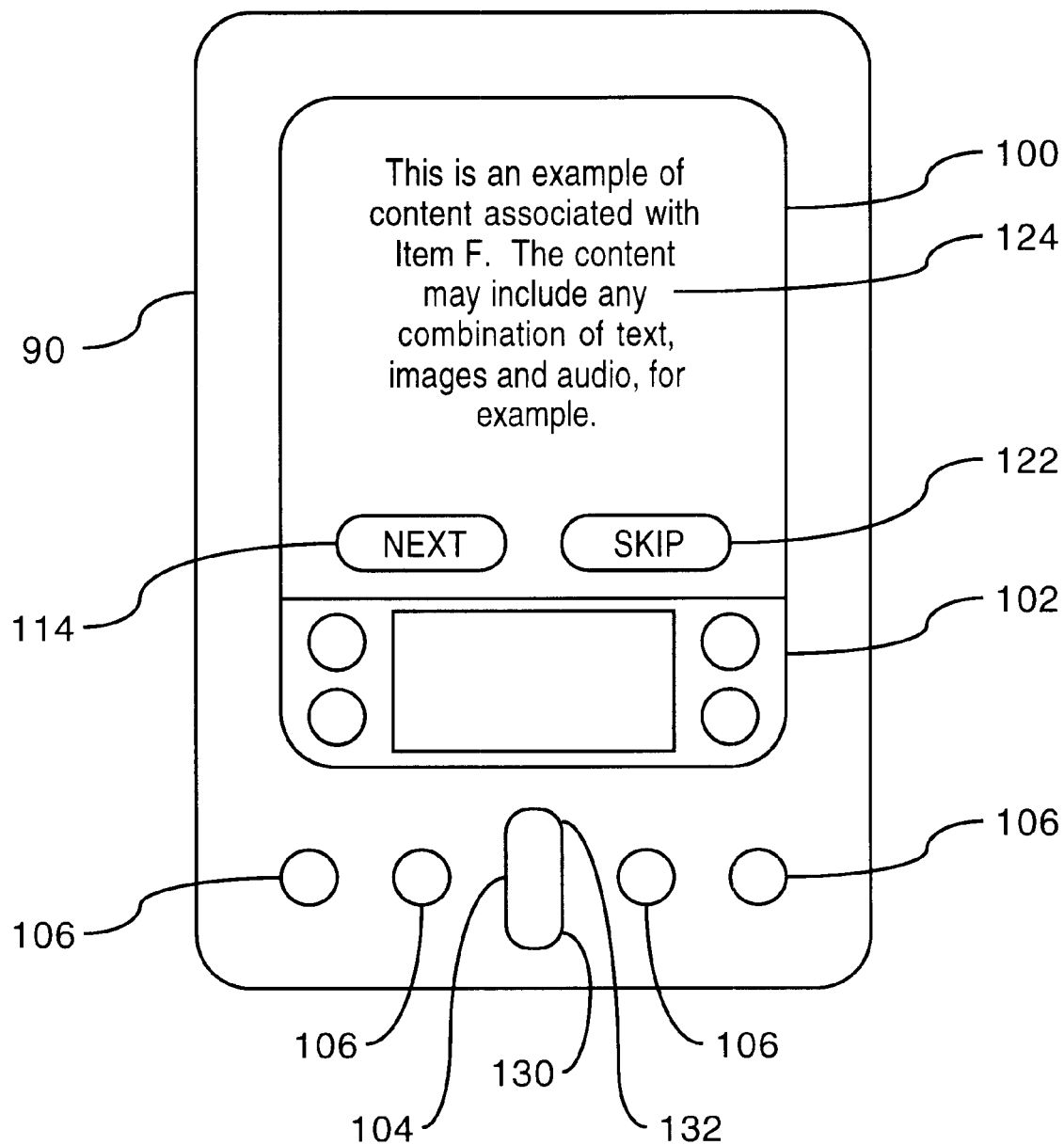
FIG. 8 shows an embodiment of a third display provided in response to the selection of the first control.

FIG. 8 shows an embodiment of a third display provided in response to the selection of the first control. Based on the selection of the first control, items C, D and E are removed from the browsing list. The touch screen 100 displays content 124 associated with the next item in the browsing sequence, namely item F.

Since item F is not an internal item of the tree, item G is displayed thereafter based upon the end user selecting either the first control or the second control. Optionally, the portion 122 of the touch screen 100 may be made inactive for selecting the first control since item F is not an internal item of the tree. In this case, for example, the touch screen 100 may either display the first control in phantom or omit displaying the first control.

Figure 9:
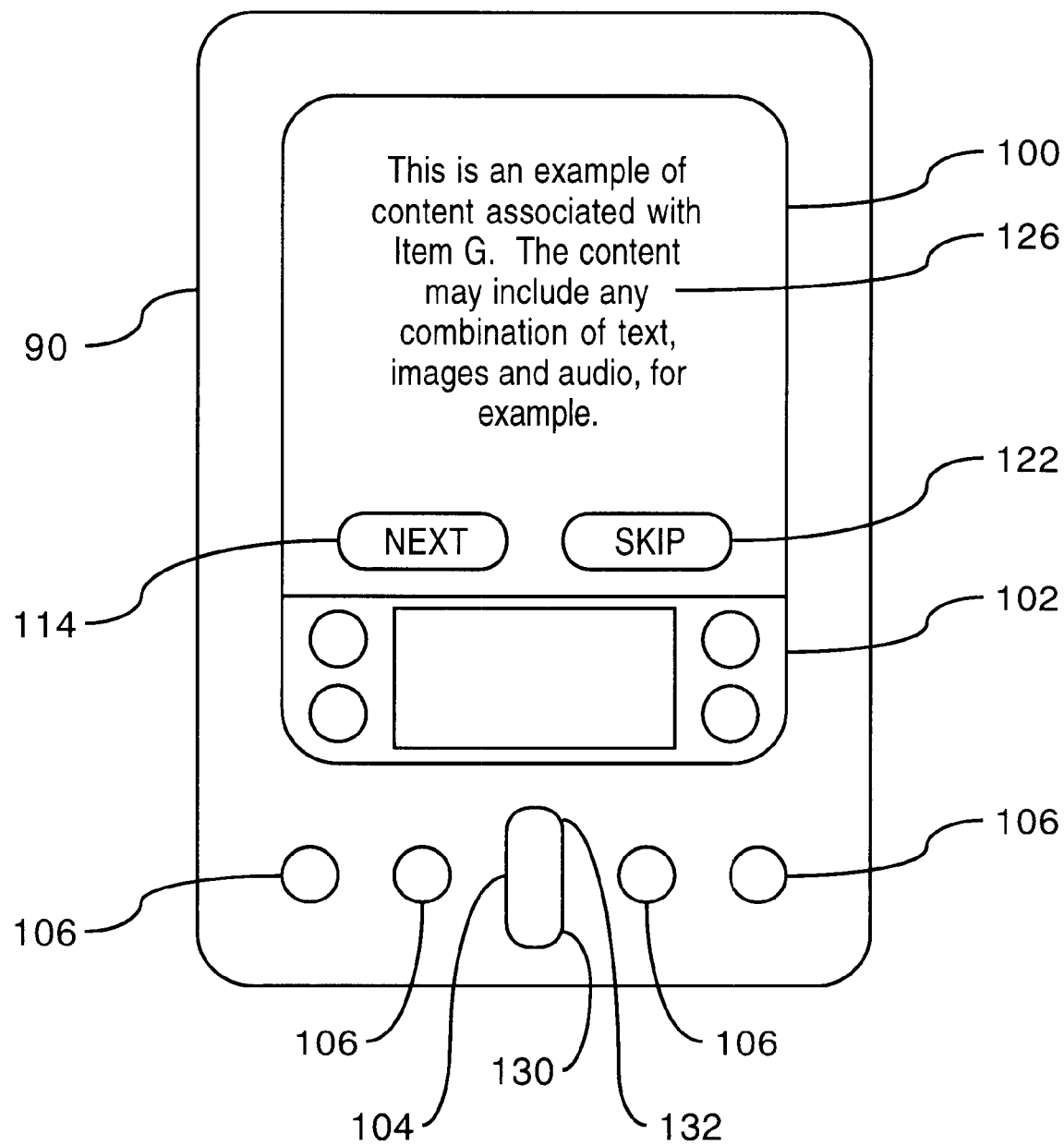
FIG. 9 shows an embodiment of a fourth display provided in response to a selection of either the first control or the second control.

FIG. 9 shows an embodiment of a fourth display provided in response to a selection of either the first control or the second control. The touch screen 100 displays content 126 associated with the next and final item in the browsing sequence, namely item G.

Optionally, the portion 122 of the touch screen 100 may be made inactive for selecting the first control since item G is not an internal item of the tree. In this case, for example, the touch screen 100 may either display the first control in phantom or omit displaying the first control.

Optionally, the portion 114 of the touch screen 100 may be made inactive for selecting the second control since item G is the final item of the browsing sequence. In this case, for example, the touch screen 100 may either display the second control in phantom or omit displaying the second control.

Either in addition to or as an alternative to the touch screen 100, the two-way rocker switch 104 may be used to provide the first and second controls. In this case, a first position 130 of the two-way rocker switch 104 may be used to select the first control, and a second position 132 may be used to select the second control.

It is noted that the present disclosure contemplates methods, articles, apparatus, and examples which include an act of providing a link to a computer site which performs an embodiment of any of the herein-disclosed methods and examples. The present disclosure also contemplates methods, articles, apparatus, and examples which include an act of providing a user-viewable advertisement for a computer site which performs an embodiment of any of the herein-disclosed methods and examples. The user-viewable advertisement may be communicated to the end user from either an advertisement provider or the computer site. The present disclosure further contemplates methods, articles, apparatus, and examples which include an act of receiving a hit from an end user who has hyperlinked from a computer site which performs an embodiment of any of the herein-disclosed methods and examples. Each of the aforementioned computer sites may include an internet site, a Web site, or another site accessible via a computer network.

It will be apparent to those skilled in the art that the disclosed inventions may be modified in numerous ways and may assume many embodiments other than the preferred forms specifically set out and described herein. For example, the acts described with reference to FIGS. 1 to 3 may be executed in an order other than that indicated by FIGS. 1 to 3. Further, some of the acts may be performed in parallel.

Accordingly, it is intended by the appended claims to cover all modifications which fall within the true spirit and scope of the present invention.

What is claimed is:

1. A method of browsing a plurality of items, the method comprising:
    (a) providing a tree which relates the plurality of items, the tree being non-unary and having a height of at least two;
    (b) providing a browsing sequence for the plurality of items;
    (c) outputting a signal to display content associated with a current item in the browsing sequence;
    (d) receiving a selection of one of a first control and a second control;
    (e) based on said receiving:
        (e1) if the first control has been selected and the current item is an internal item of the tree, removing all items from the browsing sequence which are tree-descendants of the current item; and
        (e2) if the current item is a non-final item in the browsing sequence, outputting a signal to display content associated with an item subsequent to the current item in the browsing sequence; and
    (f) repeating (d) and (e) with the subsequent item being considered as the current item.

2. The method of claim 1 further comprising determining a first plurality of similarity values between a search expression and the plurality of items, wherein said providing the browsing sequence comprises sorting the plurality of items according to the first plurality of similarity values to form the browsing sequence.

3. The method of claim 2 further comprising determining a second plurality of similarity values between a corresponding plurality of pairs of the items, wherein said providing a tree comprises determining an optimum path tree based upon the first plurality of similarity values and the second plurality of similarity values, the optimum path tree indicating a respective optimum path between the search expression and each of the plurality of items.

4. The method of claim 2 further comprising determining a second plurality of similarity values between a corresponding plurality of pairs of the items, wherein said providing a tree comprises determining an optimum spanning tree based on the first plurality of similarity values and the second plurality of similarity values.

5. The method of claim 1 wherein the browsing sequence comprises a depth-first search sequence of the tree.

6. The method of claim 1 wherein the browsing sequence comprises a breadth-first search sequence of the tree.

7. A computer-readable medium whose contents cause a computer to:
 (a) provide a tree which relates a plurality of items, the tree being non-unary and having a height of at least two;
 (b) provide a browsing sequence for the plurality of items;
 (c) output a signal to display content associated with a current item in the browsing sequence;
 (d) receive a selection of one of a first control and a second control;
 (e) based on the selection:
  (e1) if the first control has been selected and the current item is an internal item of the tree, remove all items from the browsing sequence which are tree-descendants of the current item; and
  (e2) if the current item is a non-final item in the browsing sequence, output a signal to display content associated with an item subsequent to the current item in the browsing sequence; and
 (f) repeat (d) and (e) with the subsequent item being considered as the current item.

8. The computer-readable medium of claim 7 wherein the contents further cause the computer to determine a first plurality of similarity values between a search expression and the plurality of items, and to sort the plurality of items according to the first plurality of similarity values to provide the browsing sequence.

9. The computer-readable medium of claim 8 wherein the contents further cause the computer to determine a second plurality of similarity values between a corresponding plurality of pairs of the items, and to provide the tree by determining an optimum path tree based upon the first plurality of similarity values and the second plurality of similarity values, the optimum path tree indicating a respective optimum path between the search expression and each of the plurality of items.

10. The computer-readable medium of claim 8 wherein the contents further cause the computer to determine a second plurality of similarity values between a corresponding plurality of pairs of the items, and to provide the tree by determining an optimum spanning tree based on the first plurality of similarity values and the second plurality of similarity values.

11. The computer-readable medium of claim 7 wherein the browsing sequence comprises a depth-first search sequence of the tree.

12. The computer-readable medium of claim 7 wherein the browsing sequence comprises a breadth-first search sequence of the tree.

13. An apparatus for browsing a plurality of items, the apparatus comprising:
 a computer programmed to:
  (a) provide a tree which relates the plurality of items, the tree being non-unary and having a height of at least two;
  (b) provide a browsing sequence for the plurality of items;
  (c) output a signal to display content associated with a current item in the browsing sequence;
  (d) receive a selection of one of a first control and a second control;
  (e) based on the selection:
   (e1) if the first control has been selected and the current item is an internal item of the tree, remove all items from the browsing sequence which are tree-descendants of the current item; and
   (e2) if the current item is a non-final item in the browsing sequence, output a signal to display content associated with an item subsequent to the current item in the browsing sequence; and
  (f) repeat (d) and (e) with the subsequent item being considered as the current item.

14. The apparatus of claim 13 wherein the computer is further to determine a first plurality of similarity values between a search expression and the plurality of items, and to sort the plurality of items according to the first plurality of similarity values to provide the browsing sequence.

15. The apparatus of claim 14 wherein the computer is further to determine a second plurality of similarity values between a corresponding plurality of pairs of the items, and to provide the tree by determining an optimum path tree based upon the first plurality of similarity values and the second plurality of similarity values, the optimum path tree indicating a respective optimum path between the search expression and each of the plurality of items.

16. The apparatus of claim 14 wherein the computer is further to determine a second plurality of similarity values between a corresponding plurality of pairs of the items, and to provide the tree by determining an optimum spanning tree based on the first plurality of similarity values and the second plurality of similarity values.

17. The apparatus of claim 13 wherein the browsing sequence comprises a depth-first search sequence of the tree.

18. The apparatus of claim 13 wherein the browsing sequence comprises a breadth-first search sequence of the tree.

* * * * *